US006091167A

United States Patent [19]

Vu et al.

[11] Patent Number: 6,091,167

[45] Date of Patent: Jul. 18, 2000

[54] DOUBLE COIL ACTUATOR

[75] Inventors: Toan Vu, San Diego; Chia-Tung Chen, Fullerton; Edward A. Neff, Rancho Santa Fe; David Huang, Carlsbad, all of Calif.

[73] Assignee: Systems, Machines, Automation Components, Corporation, Carlsbad, Calif.

[21] Appl. No.: 08/880,271

[22] Filed: Jun. 23, 1997

[51] Int. Cl.7 .................................................... H02K 41/00

[52] U.S. Cl. ............................... 310/12; 29/834; 318/115

[58] Field of Search ................................ 310/12, 13, 14; 318/135, 115; 29/740, 741, 743, 744, 834

[56] References Cited

U.S. PATENT DOCUMENTS

| | | | |
|---|---|---|---|
| 3,599,020 | 8/1971 | Harris et al. | 310/13 |
| 4,498,023 | 2/1985 | Stout | 310/14 |
| 4,575,652 | 3/1986 | Gogue | 310/49 R |
| 4,750,272 | 6/1988 | Caddell | 33/639 |
| 4,809,430 | 3/1989 | Maruyama et al. | 29/834 |
| 4,935,676 | 6/1990 | Pelta | 318/135 |
| 5,175,456 | 12/1992 | Neff et al. | 310/13 |
| 5,310,064 | 5/1994 | Neff et al. | 209/604 |
| 5,315,189 | 5/1994 | Neff et al. | 310/12 |
| 5,317,222 | 5/1994 | Neff et al. | 310/13 |
| 5,446,323 | 8/1995 | Neff et al. | 310/12 |
| 5,451,824 | 9/1995 | Sieber et al. | 318/453 |
| 5,519,295 | 5/1996 | Jatnieks | 310/12 |
| 5,598,044 | 1/1997 | Satomi et al. | 310/12 |

*Primary Examiner*—Nestor Ramirez
*Assistant Examiner*—Judson H. Jones
*Attorney, Agent, or Firm*—Nydegger & Associates

[57] ABSTRACT

An electric voice coil actuator includes two coils slidingly mounted on a ferromagnetic housing. The coils, which are connected to each other in most applications, are mounted co-axially for linear reciprocal movement in respective magnetic fields. The north poles of a first pair of magnets are affixed to the housing to create the magnetic fields in which the first coil moves. The south poles of a second pair of magnets are affixed to the housing to create the magnetic fields in which the second coil moves. Alternately, the coils can move in the same magnetic field. Opposing poles of the pairs of magnets are affixed to the housing to prevent magnetic saturation of the housing. The coils are electrically connected to an electric current source to produce magnetic fields that interact with the magnetic fields of the magnets to cause movement of the coils. The electric current source may be electrically connected in parallel to each coil, to cause substantially identical movement of the coils. The coordinated movement of the two coils produces more motive force than one coil. Alternatively, the coils may be electrically connected to separate electric current sources. Employing separate current sources permits using the second coil to oppose the movement of the first coil, to brake the motion of the coils for more accurate positioning of the coils.

19 Claims, 2 Drawing Sheets

DOUBLE COIL ACTUATOR

FIELD OF THE INVENTION

The present invention pertains generally to machines which are useful for the automated assembly of products. More specifically, the present invention pertains to devices which are useful for moving and positioning component parts during the automated assembly of products. The present invention is particularly, but not exclusively, useful as an actuator having at least two electric coils which act in concert to move and position component parts during the automated assembly of products.

BACKGROUND OF THE INVENTION

Numerous devices that are useful for the automated manufacture and assembly of products have been used successfully for many years. In each instance, these devices have been employed with a view towards increasing the efficiencies and accuracies of the procedures followed during the manufacture and assembly of a completed product. Indeed, the vast majority of consumer products are now produced with automated devices.

As the complexity of a manufactured product increases there may also be a commensurate increase in the complexity of the machines that are required to manufacture the product. This is particularly so where the component parts have small or irregular shapes, or where precision machining or assembly is important. For example, many products, including printed circuit boards, require that small components be accurately positioned and then inserted into other components. The process of positioning becomes increasingly difficult as smaller components are used, or where the components have irregular or varying shapes.

One type of device that has been successfully utilized as part of automated assembly systems is the linear voice coil actuator. Actuators of this type include an electromagnetic coil which interacts with a fixed-pole magnet. As is well known, when an electric current is applied to the electromagnetic coil, the coil generates its own magnetic field. If the electromagnetic coil is properly oriented relative to the fixed-pole magnet, this magnetic field that is generated by the electromagnetic coil will interact with the magnetic field produced by the fixed-pole magnet and cause the electromagnetic coil to move with respect to the fixed-pole magnet. Typically, in a voice coil actuator, a shaft is attached to the coil such that the shaft moves translationally with the moving coil. Further, a probe, gripper, or other tool may be attached to the shaft. In use, the tool which has been attached to the shaft is advanced by the actuator until the tool is positioned proximate an assembly component. The component is then manipulated by the tool and possibly moved by the actuator, as desired.

When using an actuator to move a product component, it is often desirable to move the component as quickly as possible in order to speed up the assembly process. In pursuing this objective, the shortcoming of present actuators is that they are not able to accelerate and move components as quickly as is desired. Further, not only is it desirable that the components be moved quickly, they must also be moved and positioned with extreme precision. Thus, speed can be crucial. Not surprisingly, these concerns are most pronounced when it is necessary to move relatively larger components that have relatively larger masses.

The basic problem confronted in the operation of a voice coil actuator involves quickly accelerating and decelerating the motion of the actuator and the component that is being moved. If proper control is not maintained, there can be an unacceptable overshoot of the desired position of the component. As indicated above, this problem is more severe with components having relatively larger masses, and when the actuator and component are moving at a relatively high velocity. A solution, however, is to provide an actuator which is capable of generating greater accelerating and decelerating forces. Greater forces, however, generally mean larger actuators. But, large actuators are not always practical, since space and weight limitations often require an actuator that is relatively small and relatively compact.

In light of the above, it is an object of the present invention to provide an actuator that can quickly accelerate components having relatively large masses. Another object of the present invention is to provide an actuator that can move components having relatively large masses at a relatively high velocity. Another object of the present invention is to provide an actuator that can quickly decelerate and accurately stop the motion of an actuator and a component. Still another object of the present invention is to provide an actuator that is compact. Yet another object of the present invention is to provide a high velocity, accurately stoppable, compact actuator, which is easy to manufacture, simple to use, and comparatively cost effective.

SUMMARY

An electric voice coil actuator in accordance with the present invention includes an actuator housing and a magnet assembly which is fixedly mounted on the housing. Additionally, the voice coil actuator includes a pair of electrical coils which are slidingly mounted and positioned on the housing to interact with the magnetic field of the magnet assembly. Electric currents through the coils can then selectively generate forces between the magnetic field of the magnet and the magnetic fields of the coils which will move the coils individually or in concert. A shaft, which includes a tool that is useful in a product assembly process, is attached to the coils for movement therewith.

The magnet assembly of the present invention preferably includes both a first magnetic unit and a second magnetic unit. Further, each of these magnetic units includes at least one permanent magnet. More specifically, the North pole of the magnet or magnets in the first magnetic unit are attached to the actuator housing, and the South pole of the magnet or magnets in the second magnetic unit are attached to the actuator housing. As so positioned, each magnetic unit creates a separate magnetic field within the housing. As indicated above, these magnetic fields are intended to interact with the magnetic fields generated by the magnetic coils.

Preferably, each electrical coil in the actuator of the present invention is wound around a bobbin which slides on the actuator housing. Further, each coil is electrically connected to a current source and, according to well known physics, whenever a current from the current source is passed through the wound electrical wires of a coil, the coil generates a magnetic field. It is the interaction of the coil's magnetic field with the magnetic fields of the magnet assembly which generates forces that move the coil on the actuator housing. For the present invention, it is important that the electrical coils of the voice coil actuator be properly aligned with each other. Specifically, they should be aligned on the actuator housing for co-axial, or co-linear, movement.

Within the basic structure for the voice coil actuator set forth above, various magnetic unit and electrical coil configurations are possible. These various configurations lead to alternative embodiments. For instance, it will be appreciated that the wiring of the coils can be either in series or in parallel. Preferably, of course, the wiring is in parallel in order to reduce voltage requirements. Also, the coils can be connected to separate voltage sources and operated so as to either assist or oppose each other. For example, one coil can act as a brake on the action of the other both coil. Further, the two coils can be positioned on the same bobbin. In any event, additional magnetic units, and additional electrical coils can be employed.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
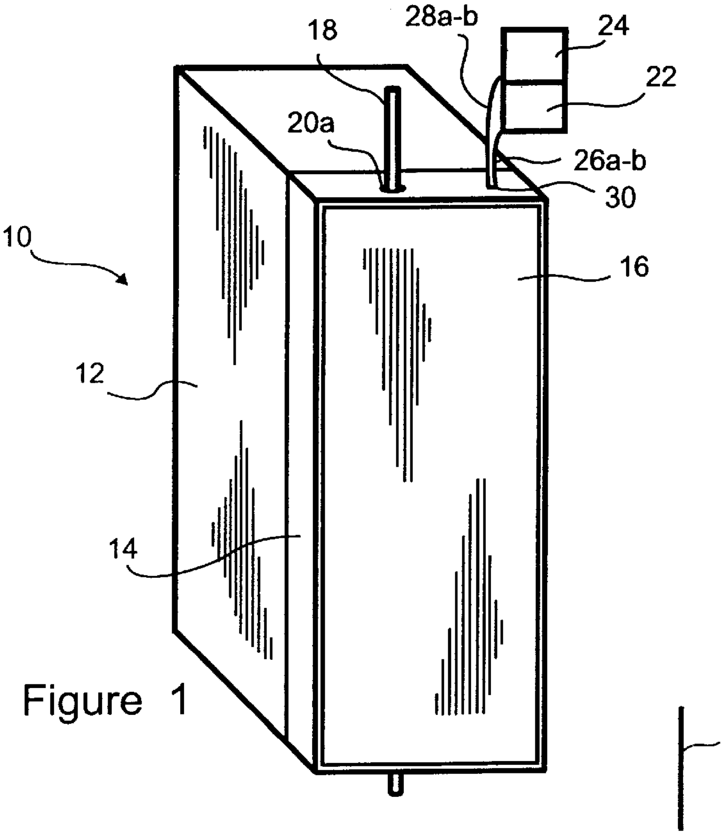
FIG. 1 is a perspective view of the double coil actuator of the present invention in its operative environment.

Referring initially to FIG. 1, a double coil actuator in accordance with the present invention is shown in its operative environment and is generally designated 10. The actuator 10 includes a ferromagnetic housing 12, a housing extension 14, and a front cover 16. A shaft 18 is positioned for linear reciprocal movement through holes 20*a–b* in the housing extension 14. Electric current sources 22, 24 are respectively electrically connected to wires 26*a–b* and 28*a–b,* to supply electric current to the actuator through a hole 30 in the housing extension 14. Electric current sources 22, 24 supply selectively variable electric current of selectively variable electrical polarity.

Figure 2:
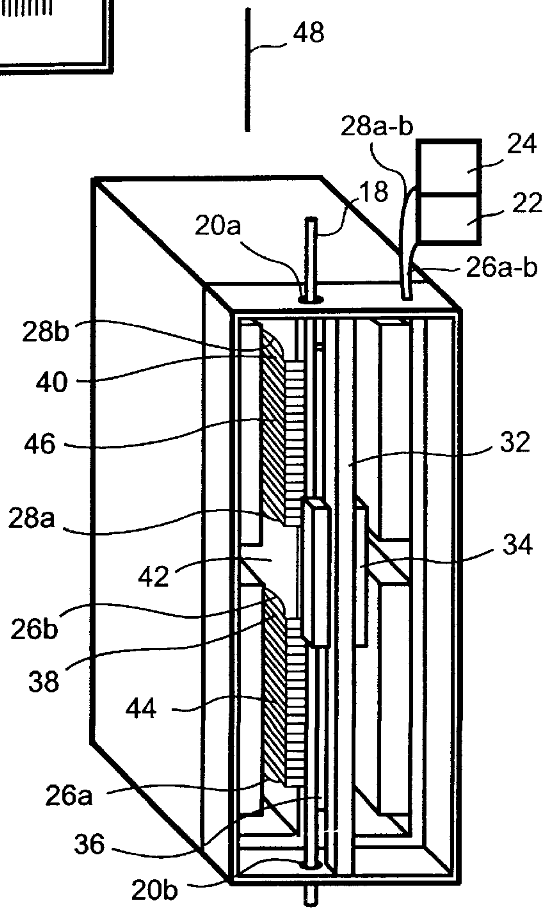
FIG. 2 is a perspective view of the double coil actuator of FIG. 1, with the front cover of the actuator removed.

Referring now to FIG. 2, the double coil actuator 10 of the present invention is shown with the front cover 16 removed. A rail 32 is mounted on the housing extension 14 and a slide unit 34 is slidingly mounted on the rail 32 for linear reciprocal movement thereon. A piston 36 is attached to the slide unit 34 for movement with the slide unit 34 and the shaft 18 is attached to the piston 36 for linear reciprocal movement with the piston 36 and the slide unit 34. A first bobbin 38 and a second bobbin 40 circumscribe a center bar 42 of the housing 12, and are connected to the piston 36 for linear reciprocal movement with the piston 36, the shaft 18, and the slide unit 34. A first electric coil 44 is wound around the first bobbin 38 and secured to the first bobbin 38. Similarly, a second electric coil 46 is wound around the second bobbin 40 and secured to the second bobbin 40. The first electric coil 44 is mounted in co-axial alignment with the second electric coil 46, such that the longitudinal axes of the electric coils 44, 46 are colinear with a line 48. Electromotive force supplied by the electric coils 44, 46 causes linear reciprocal movement of the bobbins 38, 40, the piston 36, the shaft 18, and the slide unit 34.

Figure 3:
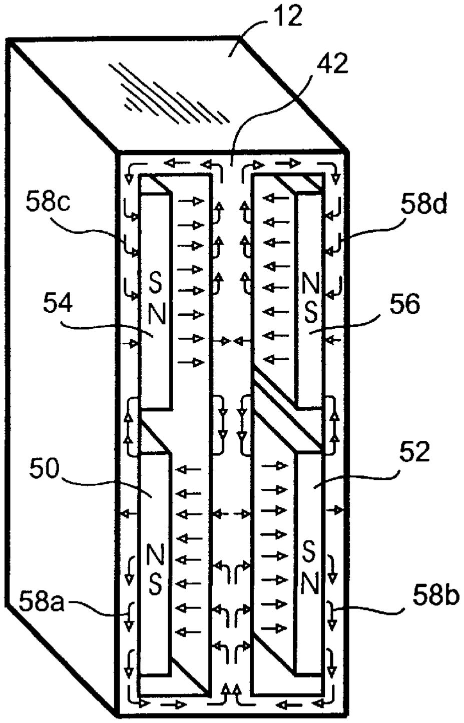
FIG. 3 is a perspective view of the magnets and the housing of the double coil actuator of FIG. 1, showing a depiction of the lines of magnetic flux.

As shown in FIG. 3, magnets 50, 52, 54, 56 are affixed to the housing 12. Specifically, magnets 50 and 52 define a first magnetic unit, and are located on the housing for magnetic interaction with the first electric coil 44 (See FIG. 2). Similarly, magnets 54 and 56 define a second magnetic unit, and are located on the housing for magnetic interaction with the second electric coil 46 (See FIG. 2). The first magnetic unit and the second magnetic unit together define a magnet assembly.

Significantly, the north poles of magnets 50, 52 of the first magnetic unit are affixed to the housing 12. As shown in FIG. 3, the housing 12 provides a return path for the magnetic flux 58*a* associated with the magnet 50, and for the magnetic flux 58*b* associated with the magnet 52. As a result of this arrangement of magnets 50, 52 housing 12, and center bar 42, the flux 58*a–b* is directed outward from both sides of the portion of the center bar 42 that is adjacent the first electric coil 44. Consequently, when an electric current 60, shown in FIG. 4, flows through the first electric coil 44, magnetic flux 58*a* and magnetic flux 58*b* cross the electric current 60 in generally the same direction relative to the electric current 60, namely, from the inside of the first electric coil 44 to the outside of the first electric coil 44. As is widely known in the art, this relationship between the magnetic flux 58*a–b* and the electric current 60 causes electric coil 44 to move parallel to line 48.

As a result of this arrangement of the magnets 50, 52 and the housing 12, the force on the first electric coil 44 generated due to flux 58*a* is additive to the force generated due to flux 58*b*. Thus, utilizing the two magnets 50, 52 produces more motive force than a single magnet, and also distributes the force equally on opposite sides of the first electric coil 44. Further, magnetic flux 58*a–b* crosses generally perpendicular to electric current 60, which, as is widely known in the art, is the most efficient relationship for producing movement of the first electric coil 44.

In contrast to magnets 50 and 52 of the first magnetic unit, it is the south poles of magnets 54, 56 of the second magnetic unit that are affixed to the housing 12. As shown in FIG. 3, the housing 12 provides a return path for the magnetic flux 58*c* associated with the magnet 54, and for the magnetic flux 58*d* associated with the magnet 56.

As a result of this arrangement of magnets 54, 56, housing 12, and center bar 42, the flux 58*c–d* is directed inward toward both sides of the portion of the center bar 42 that is adjacent the second electric coil 46. Consequently, when an electric current 62, shown in FIG. 4, flows through the second electric coil 46, magnetic flux 58*c* and magnetic flux 58*d* cross the electric current 62 in generally the same direction relative to the electric current 62, namely, from the outside of the second electric coil 46 to the inside of the second electric coil 46. As is widely known in the art, this relationship between the magnetic flux 58*c–d* and the electric current 62 causes electric coil 46 to move parallel to line 48.

As a result of this arrangement of the magnets 54, 56 and the housing 12, the force on the second electric coil 46 generated due to flux 58*c* is additive to the force generated due to flux 58*d*. Thus, utilizing the two magnets 54, 56 produces more motive force than a single magnet, and also distributes the force equally on opposite sides of the second electric coil 46. Further, magnetic flux 58*c–d* crosses generally perpendicular to electric current 62, which, as is widely known in the art, is the most efficient relationship for producing movement of the second electric coil 46.

Figure 4:
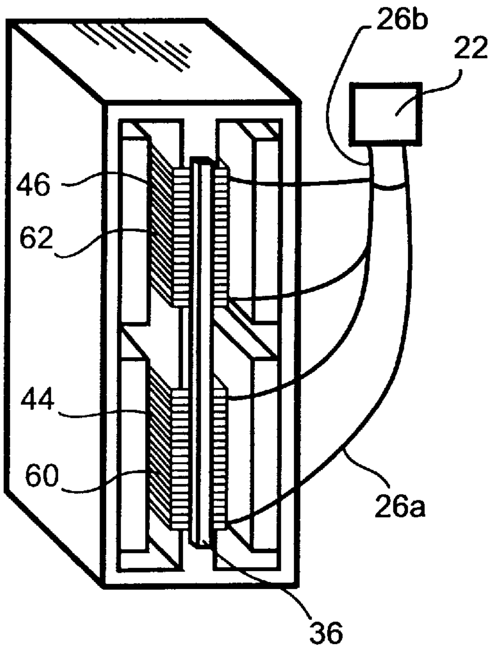
FIG. 4 is a perspective view of the double coil actuator of FIG. 1, with parts of the actuator removed to reveal the separate bobbins and the single piston.

Due to the orientation of magnets 50, 52 on the housing 12 relative to the orientation of magnets 54, 56 on the housing 12 as discussed above, flux 58*a–b* crosses the first electric coil 44 opposite to the direction that flux 58*c–d* crosses the second electric coil 46. Consequently, if electric current 60 flows through the first electric coil 44 in a direction opposite to electric current 62 flowing through the second electric coil 46 as shown in FIG. 4, then the first electric coil 44 will move in the same direction as the second electric coil 46. This may be accomplished by electrically connecting the first electric coil 44 and the second electric coil 46 in parallel to a single electric current source 22, but with opposite electrical polarity, as shown in FIG. 4. Accordingly, the wires 26*a–b* from the electric current source 22 are connected between the electric current source 22 and the first electric coil 44. Similarly, the wires 26*a–b* from the electric current source 22 are also connected to the second electric coil 46, but with the polarity of the wires 26*a–b* reversed. As shown in FIGS. 2 and 4, a single piston 36 is affixed to the first bobbin 38 and the second bobbin 40, to transfer the concerted movement of the first electric coil 44 and the second electric coil 46 to the piston 36 and to the shaft 18 connected to the piston 36. It will be appreciated by those skilled in the art that combining the electromotive force of the two electric coils 44, 46 produces more motive force for moving piston 36 than the motive force produced by either electric coil 44 or electric coil 46 alone. Further, additional pairs of magnets and corresponding coils can be added to the actuator 10 to generate even greater motive force.

Importantly, the north poles of the magnets 50, 52 are affixed to the housing 12 adjacent the south poles of the magnets 54, 56. It will be appreciated by the skilled artisan that this alternating arrangement of north and south poles produces less magnetic flux density in the housing 12 than if all of the south poles or all of the north poles are affixed to the housing 12. The skilled artisan will also appreciate that this arrangement of the magnets 50, 52, 54, 56 also produces less magnetic flux density in the housing 12 than an actuator using a single pair of larger magnets to generate a similar amount of motive force on a coil. Those skilled in the art will appreciate that the reduced flux density in the housing 12 of the actuator 10 permits using a smaller housing 12, without producing undesirable magnetic saturation of the housing 12.

In the embodiment of the actuator 10 previously discussed and shown in FIG. 2, the first electric coil 44 and the second electric coil 46 are independently electrically connected to the two separate current sources 22, 24 respectively. Connecting the electric coils 44, 46 to separate electric current sources 22, 24 permits sophisticated control of the joint motion of the two coils 44, 46, which can be computer controlled. For example, the second coil 46 can be used to selectively oppose or support the force generated by the first coil 44, for more accurate control of the movement and positioning of the shaft 18 affixed to the piston 36. Additional pairs of magnets (not shown), and corresponding coils (not shown) electrically connected to corresponding additional electric current sources (not shown) can be utilized for even more sophisticated control of the movement of the shaft 18.

Figure 5:
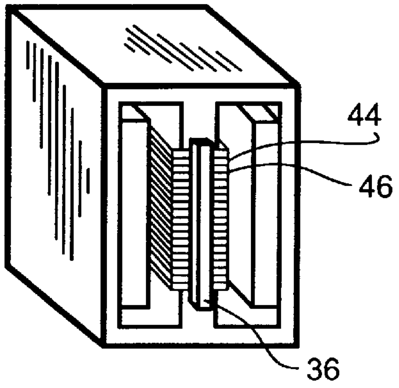
FIG. 5 is a perspective view of the double coil actuator of the present invention, with the coils wound on a single bobbin, with parts of the actuator removed to reveal the coils and the bobbin.
Figure 6:
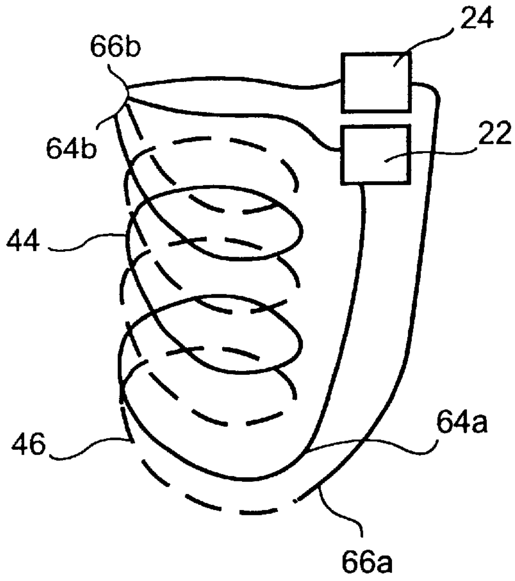
FIG. 6 is a depiction of the relationship between two coils of the present invention when the coils are wound on a single bobbin.

The alternative embodiment shown in FIG. 5 utilizes one electric coil 44 wound over another electric coil 46, as depicted in FIG. 6. In this embodiment, the electric coils 44, 46 are electrically connected to separate electric current sources 22, 24. For example, the ends 64*a–b* of the wire of the first electric coil 44 are connected to electric current source 22, and the ends 66*a–b* of the wire of the second electric coil 46 are electrically connected to electric current source 24. This arrangement permits sophisticated control of the joint motion of the coils 44, 46 as discussed above, for example using coil 46 to selectively oppose or support the force generated by coil 44.

Figure 7:
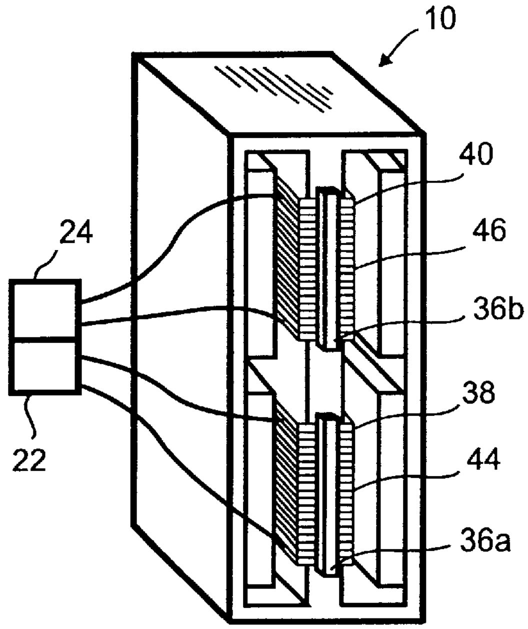
FIG. 7 is a perspective view of the double coil actuator of the present invention, with separate bobbins and separate pistons, with parts of the actuator removed to reveal the bobbins and the pistons.

Another alternative embodiment is shown in FIG. 7, in which the bobbins 38, 40 secured to each electric coil 44, 46 are affixed to separate pistons 36*a–b*. In this embodiment, the first electric coil 44 is electrically connected to electric current source 22, and the second electric coil 46 is electrically connected to the electric current source 24. This arrangement permits independent movement of separate shafts 18 (not shown) separately connected to each piston 36*a–b*, with a single actuator 10. Additional pairs of magnets and corresponding coils (not shown) can be added to the actuator 10 to independently control additional shafts 18.

While the particular double coil actuator 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. An actuator comprising:

a housing;

a magnet assembly engaged with said housing for generating a magnetic field;

a first electric coil slidingly mounted on said housing and defining an axis;

a second electric coil defining an axis and slidingly mounted on said housing in co-axial alignment with said first electric coil;

an electric current source electrically connected to said first electric coil and to said second electric coil for independently energizing said coils to generate respective magnetic fields interactive with said magnetic field for linear reciprocal movement of said coils; and wherein said first electric coil and said second electric coil are electrically connected in parallel to said electric current source for substantially concerted movement of said first coil and said second coil.

2. An actuator as recited in claim 1 further comprising a bobbin, said first electric coil and said second electric coil being secured around said bobbin for movement therewith.

3. An actuator as recited in claim 1 further comprising a first bobbin and a second bobbin, said first electric coil being secured around said first bobbin for movement therewith, and said second electric coil being secured around said second bobbin for movement therewith.

4. An actuator as recited in claim 3 wherein said first bobbin is connected to said second bobbin for movement therewith.

5. An actuator comprising:

a housing;

a magnet assembly engaged with said housing for generating a magnetic field;

a first electric coil slidingly mounted on said housing and defining an axis;

a second electric coil defining an axis and slidingly mounted on said housing in co-axial alignment with said first electric coil; and an electric current source electrically connected to said first electric coil and to said second electric coil for independently energizing said coils to generate respective magnetic fields interactive with said magnetic field for linear reciprocal movement of said coils further comprising an additional electric current source, said first electric coil being electrically connected to said electric current source, and said second electric coil being electrically connected to said additional electric current source.

6. An actuator as recited in claim 5, wherein said additional electric current source supplies said second electric coil with electric current for said second electric coil to oppose the movement of said first electric coil.

7. An actuator as recited in claim 1 wherein said housing is ferromagnetic, and wherein said magnet assembly includes a first magnetic unit and a second magnetic unit, said first magnetic unit having at least one magnet with a north pole affixed to said housing to generate a first magnetic field interactive with said first electric coil, and a second magnetic unit having at least one magnet with a south pole affixed to said housing to generate a second magnetic field interactive with said second electric coil.

8. An actuator as recited in claim 7 wherein said north pole of said magnet of said first magnetic unit is mounted on said housing adjacent said south pole of said magnet of said second magnetic unit, to reduce the magnetic flux density of said housing.

9. An actuator as recited in claim 1 wherein said housing is ferromagnetic, and wherein said housing includes a center bar, said first electric coil and said second electric coil circumscribing said center bar.

10. An actuator comprising:

a ferromagnetic housing;

a first magnetic unit including at least one magnet having a north pole affixed to said ferromagnetic housing to establish a first magnetic field;

a second magnetic unit including at least one magnet having a south pole affixed to said ferromagnetic housing to establish a second magnetic field;

a first electric coil slidingly mounted on said ferromagnetic housing for movement in said first magnetic field;

a second electric coil slidingly mounted on said ferromagnetic housing for movement in said second magnetic field; and an electric current source electrically connected to said first electric coil and to said second electric coil for independently energizing said coils to generate respective magnetic fields interactive with respectively said first magnetic field and said second magnetic field for linear reciprocal movement of said coils.

11. An actuator as recited in claim 10, wherein said first magnetic unit includes two magnets with each said magnet having a north pole affixed to said ferromagnetic housing for establishing magnetic fields for interaction with said first coil, and wherein said second magnetic unit includes two magnets with each said magnet having a south pole affixed to said ferromagnetic housing for establishing magnetic fields for interaction with said second coil.

12. An actuator as recited in claim 10 wherein said north pole of said first magnetic unit is mounted on said ferromagnetic housing adjacent said south pole of said second magnetic unit, to prevent magnetic saturation of said ferromagnetic housing.

13. An actuator as recited in claim 11 wherein said north poles of said magnets of said first magnetic unit are mounted on said ferromagnetic housing adjacent said south poles of said magnets of said second magnetic unit, to reduce the magnetic flux density of said ferromagnetic housing.

14. An actuator as recited in claim 10 further comprising a first bobbin and a second bobbin, said first electric coil being secured around said first bobbin for movement therewith, and said second electric coil being secured around said second bobbin for movement therewith.

15. An actuator as recited in claim 14 wherein said first bobbin is connected to said second bobbin for movement therewith.

16. An actuator as recited in claim 10 wherein said ferromagnetic housing includes a center bar, and wherein said first electric coil and said second electric coil are mounted co-axially to circumscribe said center bar.

17. An actuator as recited in claim 10 wherein said first electric coil and said second electric coil are electrically connected in parallel to said electric current source for substantially concerted movement of said first electric coil and said second electric coil.

18. An actuator as recited in claim 10 further comprising an additional electric current source, said first electric coil being electrically connected to said electric current source, and said second electric coil being electrically connected to said additional electric current source.

19. An actuator as recited in claim 18 wherein said additional electric current source supplies said second electric coil with electric current for said second electric coil to oppose the movement of said first electric coil.

* * * * *